E. J. KEAHN.
ATTACHMENT FOR FUR SEWING MACHINES.
APPLICATION FILED APR. 1, 1915.
1,224,174.
Patented May 1, 1917.
2 SHEETS—SHEET 2.
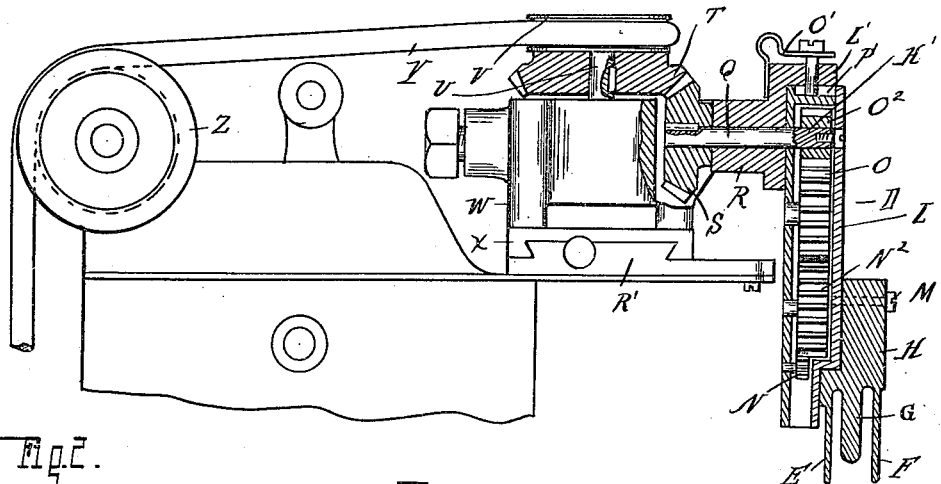

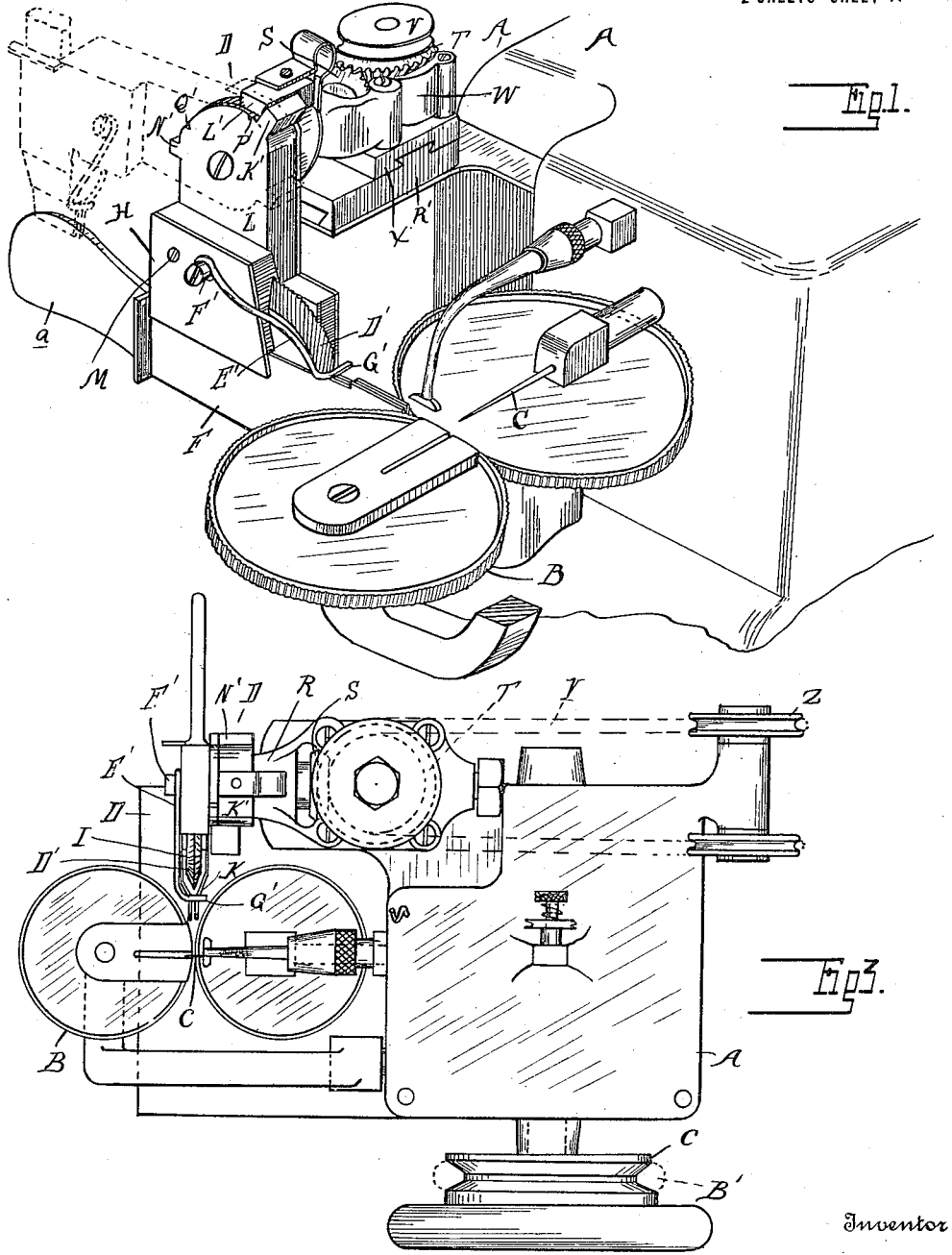

UNITED STATES PATENT OFFICE.

EMIL J. KEAHN, OF DETROIT, MICHIGAN.

ATTACHMENT FOR FUR-SEWING MACHINES.

1,224,174. Specification of Letters Patent. Patented May 1, 1917.

Application filed April 1, 1915. Serial No. 18,476.

*To all whom it may concern:*

Be it known that I, EMIL J. KEAHN, a citizen of the United States of America, residing at Detroit, in the county of Wayne and State of Michigan, have invented certain new and useful Improvements in Attachments for Fur-Sewing Machines, of which the following is a specification, reference being had therein to the accompanying drawings.

My invention relates to attachments for fur sewing machines, and has among the objects thereof to provide an efficient guide for bringing the material into proper relation to the feed rolls for the needle with the fur brushed away from the seam; to provide a construction of guide which, when the fur has been brushed away from the seam, will hold the fur in this position until after the stitching operation; to provide a structure which will allow the material to be readily engaged with the guide; and to provide an attachment by which the guide may be accurately positioned in relation to the rolls. Other objects of the invention will more fully hereinafter appear.

The invention resides in the peculiar construction, arrangement and combination of parts as hereinafter set forth and particularly pointed out in the claims.

In the drawings,—

Figure 1 is a fragmentary perspective view of the machine embodying the invention;

Fig. 2 is a sectional side elevation illustrating the attachment; Fig. 3 is a top plan view; and Figs. 4 and 5 illustrate certain details of construction.

A designates a machine for sewing fur or the like, and B the feed rolls for the needle C. As these parts are well known to the trade, and since my improvement is adapted to be applied to various types of machines, it is not deemed necessary to describe the sewing machine in detail.

My improved attachment designated by D, has a guide for the fur, composed of sides E and F between which is arranged a partition G. The sides E and F are connected at their upper edges to a support H for a portion only of their length, the support H and sides E and F in the construction shown being formed of an integral structure. The forward ends of the members E and F which extend beyond the support and the partition G are formed of comparatively thin resilient metal. These extensions of the sides converge and then terminate in parallel portions. I is a disk journaled upon a shaft J in the support H and arranged between the sides E and F. The forward edge of the disk I is positioned in close proximity to the rear edges K of the parallel portions of the sides. In order to allow the disk being positioned between the sides, the partition G and support H are chambered as shown in Figs. 2, 4 and 5 to receive the disk, the chambered portion of the partition extending below the disk.

L is a housing to which the support H is connected as by means of screws or bolts M and within this housing are arranged gears N $N^2$ O and $O^2$. P is a pinion upon an extension of the shaft J, which meshes with the gear N, and Q is a shaft to which the gear $O^2$ is fixed. The shaft Q is journaled in an arm R and carries a beveled gear S at its inner end which meshes with a beveled gear T on a shaft U driven through the medium of a pulley V thereon. The shaft U and arm R are carried by a support W mounted upon a table X. The pulley V is driven by a belt Y which passes over idlers Z to a pulley that receives its power from the same source as the belt B' of the main driving pulley C' of the sewing machine.

The two pieces of fur to be stitched together are arranged upon opposite sides of the partition and between the sides E and F. A sufficient portion of the fur is allowed to project beyond the ends of the sides E and F to be engaged by the feed rolls B. When so arranged the disk I is between the two pieces of fur to be sewed together, while the portions of the fur beyond the disk I are yieldably pressed into engagement by the resilient extensions of the sides. With the fur so arranged in the machine, when power is applied to the belt Y and to the pulley C' of the sewing machine, the pulley V will be driven, which will rotate the shaft Q and through the medium of the gears T and S, drive the shaft Q. This will operate the gear N to drive the pinion P and rotate the disk I. As shown, the pinion P is small, providing a step-up drive train, and therefore, effecting a rotation of the disk I at a high rate of speed. Rotation of the feed rolls B of the sewing machine will feed the fur from the guide across the path of the needle C, but since the sides of the disk are serrated as indicated at D', as the fur is fed past the disks it will brush the fur proper down away from the edge of the hide to be sewed, thereby permitting a proper seam to be made. Since the projections of the sides are resilient, after the fur proper is brushed down by the disk I, it will be held in this position by the parallel portions of the sides, as the latter are in immediate proximity to the forward edge of the disk I. E' is a spring-pressed finger secured to the support at F' and having a laterally-extending finger G' positioned in advance of but in close proximity to the forward edge of the disk I. The portion G' acts as a gage for limiting the height of the pieces of fur as they pass out of engagement with the disk I.

In order to facilitate the insertion of the material to be sewed between the sides E and F, the guide is preferably so mounted as to be swung outwardly away from the feed rolls B. Thus as shown, the housing L is pivoted upon an extension H' of the shaft Q, so as to be turned from the position shown in full lines in Fig. 1 to the position shown in dotted lines in said figure. To insure the forward ends of the sides being returned to their proper relation to the feed rolls of the needle, the housing L is provided with a stop K' that abuts against a stop L' when the parts are in operative relation. N' is a stop which coöperates with the stop L' on the arm R to limit the outward swinging movement of the guide. In each of the positions of the guide, the latter is releasably locked by means of a spring-pressed pawl O' adapted to engage recesses P' Q' in the upper edge of the housing L.

I have also provided means for accurately adjusting the guide laterally and longitudinally of the needle C. Thus the table X is adjustable laterally of a second table R', while the latter table is adjustable in a direction at right angles to the adjustment of the first table upon the second. These adjustments allow the forward ends of the sides to be very accurately positioned in relation to the feed rolls B.

In order to facilitate the rocking of the attachment outwardly, I provide a handle *a* which in the particular structure illustrated, is formed as an extension of the partition G.

While I have shown and described the preferred form of the invention, I do not desire to limit my protection to the particular structure illustrated.

What I claim as my invention is:—

1. In a fur sewing machine, a guiding attachment for the material to be sewed, including guide plates, and a rotary disk positioned between the guide plates, said plates converging rearwardly of the disk.

2. In a fur sewing machine, a guiding attachment for the material to be sewed, including guide plates, and a rotary disk positioned between the guide plates, said plates converging rearwardly of the disk and terminating in substantially parallel portions.

3. In a fur sewing machine, a guiding attachment for the material to be sewed, including guide plates, and a rotary disk positioned between the guide plates, said plates having portions in rear of the disk yieldably pressed toward each other, for the purpose described.

4. In a fur sewing machine, a guiding attachment for the material to be sewed, including guide plates, a partition arranged between the plates, and a rotary disk positioned between the guide plates, said plates converging rearwardly of the disk.

5. In a fur sewing machine, a guiding attachment for the material to be sewed, including guide plates, a partition arranged between the plates, and a rotary disk positioned between the guide plates, said plates having portions substantially parallel arranged rearwardly of the disk.

6. In a fur sewing machine, a guiding attachment for the material to be sewed, including a guide, and a rotary disk positioned in the guide, said guide having portions rearwardly of the disk yieldably pressed toward each other, for the purpose described.

7. In a fur sewing machine, a guiding attachment for the material to be sewed, including guide plates, a partition arranged intermediate said guide plates, a rotary disk positioned between the plates, said partition extending beneath said disk, said plates having portions converging rearwardly of said disk and terminating in parallel portions yieldably pressed together.

8. In a fur sewing machine, the combination with the needle, of a guiding attachment for the material to be sewed, including a guide proper, a rotary disk within said guide, the rearward end of said guide extending in proximity to said needle, a support for said attachment and means for adjusting said support rectilinearly in the direction of said needle.

9. In a fur sewing machine, the combination with the needle, of a guiding attachment for the material to be sewed, including a guide proper, a rotary disk within said guide, the rearward end of said guide extending in proximity to said needle, means for adjusting said attachment in the direction of said needle, and means for adjusting said attachment at right angles to the first-mentioned adjustment.

10. In a fur sewing machine, the combination with a horizontally arranged needle, of means for advancing the material to be sewed in a vertical plane, a guiding attachment for the material, a support carrying said guiding attachment, means for adjusting said support either parallel to or toward and from the needle and means for rocking said attachment upon the support about an axis parallel with the needle.

11. In a fur sewing machine, the combination of a needle, a guiding attachment for the material to be sewed, comprising a pivoted housing, a guide carried by said housing, a rotary disk positioned within said guide, a drive train within said housing for rotating said disk, a support carrying said housing, and a driving member on said support for actuating the drive train within said housing, the pivotal axis of the housing being coincident with the axis of one of the members of said drive train.

12. In a fur sewing machine, the combination of a needle, a guiding attachment for the material to be sewed, comprising a housing, a guide carried by said housing, a rotary disk positioned within said guide, a drive train within said housing for rotating said disk, a support carrying said housing, and a driving member on said support for actuating the drive train within said housing, said housing being connected to said support to permit the housing to be rocked outwardly away from the needle.

13. In a fur sewing machine, the combination of a needle, a guiding attachment for the material to be sewed, comprising a housing, a guide carried by said housing, a rotary disk positioned within said guide, a drive train within said housing for rotating said disk, a support carrying said housing, a driving member on said support for actuating the drive train within said housing, said housing being connected to said support to permit the housing to be rocked outwardly away from the needle, and means for releasably retaining said housing in its adjusted position.

14. In a fur sewing machine, the combination of the needle, a guiding attachment for the material to be sewed, comprising spaced members, a rotary disk positioned between said spaced members, and a support carrying said members and said disk, a housing to which said support is attached, a shaft to which said disk is attached having a projection extending within said housing, a pinion connected to the projected end of said shaft, a gear train arranged within said housing for driving said pinion, a drive shaft for said gear train upon which said housing is mounted for rocking movement, a mounting carrying said shaft, and means for driving said shaft.

15. In a fur sewing machine, a guiding attachment for the material to be sewed including guide plates, a rotary disk positioned between said guide plates and a gage limiting the height of the material as it passes out of engagement with said disk.

16. In a fur sewing machine, a guiding attachment for the material to be sewed, including guide plates yieldably pressed toward each other, and a member bearing resiliently down on said guide plates limiting the height of the material passing between the plates.

17. In a fur sewing machine, a guiding attachment for the pieces to be sewed, including guide plates, a rotary disk positioned between said guide plates, a pair of feed wheels, and means interposed between the feed wheels and disk for pressing together the pieces to be sewed.

18. In a fur sewing machine, the combination with a needle, a guiding attachment for the material to be sewed, including a rotary disk, a support carrying said guiding attachment, means for adjusting the support relative to the needle, and a driving connection for the disk operative in all positions of adjustment of said support.

In testimony whereof I affix my signature in presence of two witnesses.

EMIL J. KEAHN.

Witnesses:
JOHN A. ETZOLD,
WM. J. BELKNAP.

Copies of this patent may be obtained for five cents each, by addressing the "Commissioner of Patents, Washington, D. C."